United States Patent [19]

Engel et al.

[11] Patent Number: 4,981,885

[45] Date of Patent: Jan. 1, 1991

[54] POLYMER DISPERSIONS, PROCESS FOR THEIR PREPARATION, AND THEIR USE AS BINDERS

[75] Inventors: Dieter Engel, Kelsterbach; Kurt Kraft, Wiesbaden, both of Fed. Rep. of Germany

[73] Assignee: Hoechst AG, Fed. Rep. of Germany

[21] Appl. No.: 397,770

[22] Filed: Aug. 23, 1989

Related U.S. Application Data

[63] Continuation of Ser. No. 219,998, Jul. 15, 1988, abandoned, which is a continuation-in-part of Ser. No. 941,038, Dec. 12, 1986, abandoned.

[30] Foreign Application Priority Data

Dec. 14, 1985 [DE] Fed. Rep. of Germany ....... 3544337

[51] Int. Cl.$^5$ ............................................... C08K 3/20
[52] U.S. Cl. ..................................... 523/409; 524/460
[58] Field of Search ......................... 523/409; 524/460

[56] References Cited

U.S. PATENT DOCUMENTS 4,444,923  4/1984  McCarty ............................. 523/406

*Primary Examiner*—Joseph L. Schofer
*Assistant Examiner*—Peter D. Mulcahy
*Attorney, Agent, or Firm*—Bierman and Muserlian

[57] ABSTRACT

Aqueous polymer dispersions based on (A) 1 to 99% by weight of a carboxy-functional polymer which additionally contains epoxy groups, (B) 1 to 99% by weight of a polymer obtained from at least one $\alpha,\beta$-olefinically unsaturated monomer, the polymer (B) having been prepared in the presence of polymer (A), (C) 0 to 20% by weight of anionic or non-ionic emulsifiers or a mixture of the two or protective colloids, the quantity data relating to the solids content of components (A) to (C), and if appropriate further conventional additives, the sum of all the components always being 100%.

The invention also relates to a process for the preparation of such polymer dispersions, which are particularly suitable as a binder component in metallic basecoats or metal-free, (uni) basecoats and electrocoatings.

16 Claims, No Drawings

POLYMER DISPERSIONS, PROCESS FOR THEIR PREPARATION, AND THEIR USE AS BINDERS

PRIOR APPLICATION

This application is a continuation of U.S. patent application Ser. No. 219,998 filed July 15, 1988 which is a continuation-in-part of U.S. patent application Ser. No. 941,038 filed Dec. 12, 1986, both now abandoned.

The invention relates to aqueous dispersions based on crosslinkable polymers and $\alpha,\beta$-olefinically unsaturated monomers for producing crosslinkable coatings on surfaces, to their preparation and to their use, in particular for baking finishes and paints.

Highly reactive polymer dispersions as described in German Offenlegungsschriften Nos. 3,128,025 and 3,128,062 admittedly give weather-resistant coatings, in particular in combination with reactive resins such as melamine resins. However, for example when used in multi-layer coatings, they show only inadequate adhesion properties on or between the individual paint layers.

Carboxy-functional self-curing polymers which additionally contain epoxy groups, prepared for example in accordance with German Offenlegungsschrift No. 2,811,913, in combination with melamine resins give, in metallic basecoat formulations (according to German Offenlegungsschrift No. 3,301,729), coatings which adhere well but show unfavorable properties, for example, with respect to storage in water. This applies especially to the build-up of coatings under so-called refinishing conditions, where further paint coats are applied to already coated substrates at low curing temperatures.

However, the said polymers cannot in principle be adequately controlled rheologically by means of thickeners. In an application as a binder, this is a very important disadvantage, since the rheological properties just be tailored to the various fields of use. Thus, the rheological properties of metallic basecoat paints are some of the most important properties altoether, since in this case rapid fixing of the flaky pigments is decisive for the metallic appearance of the paint applied.

Blends of polymer dispersions, for example of the polymer dispersions described in German Offenlegungsschriften Nos. 3,128,025 and 3,128,062 already cited, with the above-mentioned self-curing polymers, when combined with reactive melamine resins in aqueous metallic basecoats, do not give any improvement in the really desired combination of the properties of intercoat adhesion and stability on storage in water. On the contrary, a combination of poor intercoat adhesion and unsatisfactory stability on storage in water results as a rule. Moreover, this blend cannot be adequately thickened with conventional thickeners based on polyacrylates, polyethylene oxide, polyvinyl alcohols, cellulose ethers and others.

Those polymers are termed self-curing carboxy-functional polymers which contain in each molecule at least one carboxyl group and one epoxy group, the carboxyl group(s) of which is or are, however, neutralized with salt-forming substances, whereby a premature reaction with the epoxy groups present is prevented. In general, they are present as aqueous systems.

The object according to the invention was thus to develop aqueous binder dispersions which, in aqueous paint systems, in addition to excellent adhesion properties on various substrates or between the individual coats in the case of multicoat paint structures, also show very good stability on storage in water, in particular under so-called refinishing conditions, and are adequately controllable rheologically by means of thickeners.

The invention therefore relates to stable aqueous polymer dispersions based on (A) 1 to 99% by weight of a carboxyfunctional polymer which additionally contains epoxy groups, (B) 1 to 99% by weight of a polymer obtained from at least one $\alpha,\beta$-olefinically unsaturated monomer, the polymer (B) having been prepared in the presence of polymer (A), (C) 0 to 20% by weight of anionic or non-ionic emulsifiers or a mixture of the two or protective colloids, the quantity data relating to the solids content of components (A) to (C), and if appropriate further conventional additives, the sum of all the components always being 100%.

The invention also relates to a process for the preparation of these polymer dispersions, which comprises polymerizing, in an aqueous system at a temperature between 0° and 150° C., (B) 1 to 99% by weight of at least one $\alpha,\beta$-olefinically unsaturated monomer in the presence of (A) 1 to 99% by weight of a carboxy-functional polymer which additionally contains epoxy groups and of (C) 0 to 20% by weight of anionic or non-ionic emulsifiers or a mixture of the two or protective colloids, the quantity data relating to the solids content of components (A) to (C), and if appropriate in the presence of further additives.

Aqueous systems can in this case be true or colloidal solutions and/or dispersions.

It is to be regarded as surprising that, when using, for example, the carboxy-functional polymers according to German Offenlegungsschrift No. 2,811,913, it is possible to prepare aqueous binder dispersions and with these to formulate a metallic basecoat paint which is readily controllable rheologically and, after application, shows good intercoat adhesion coupled with excellent stability on storage in water.

By selecting suitable starting substances, it is possible to adjust the polymer properties within wide limits. For example, water-soluble or water-dispersible polymers can be prepared by polymerizing vinyl monomers, which have no crosslinking action, in the aqueous dispersion or solution of an uncrosslinked self-curing carboxy-functional polymer.

In this case, for example, the hydrophilic or even the hydrophobic properties and the hardness or flexibility can be tailored by suitable selection of the components (A) and (B). Moreover, by incorporation of reactive vinyl monomers, polymers can be prepared which are initially dispersible in water and are then converted, preferably after application to a substrate, via an appropriate aftertreatment into the crosslinked state.

Those polymers are suitable as the component (A) which are described, for example, in German Offenlegungsschriften Nos. 2,811,913 and 3,301,729. These literature references, including the preferred embodiments disclosed therein, are incorporated herein by reference. Accordingly, the carboxy-functional polymers are prepared by reacting (a) halogen-free polycarboxylic acid units, (b) salt-forming substances from the group comprising alkali, alkaline earth and quarternary ammonium salts, organic bases and/or ammonia, (c1) polymers containing OH groups and having an OH number from 20 to 300, preferably 40 to 200, and/or c2) epoxide compounds and subsequently dissolving and/or dispersing them in water. The polymers contain at least 3 of the 4 units listed above.

The molecular weight of such compounds (A) is, as the weight average $\overline{M}_w$, advantageously 2,000 to 100,000, preferably 6,000 to 50,000 (gel chromatography, polystyrene standard). Their acid number in water is in general 1 to 200, preferably 5 to 150 (relative to 100% resin). The iodine number is in most cases below 50, preferably below 20 and particularly preferable below 5. Further these compounds A, have a OH number from 10 to 100, preferably 30 to 80 and especially 40 to 70, and an epoxy number of from 0.2 to 4.0, preferably 0.3 to 1.5 and especially 0.4 to 0.9.

Preferably, the starting materials (a) to (c2) for the preparation of component A are the following compounds:

(a) a polycarboxylic acid anhydride mixture containing trimellitic acid units and corresponding to formulae (1) and (2) on the attached formula sheet and to formulae (II) to (V) of the formula sheet in German Offenlegungsschrift No. 3,301,729, which mixture can be prepared in the usual manner, for example by reacting trimellitic anhydride with the appropriate dihydric and/or polyhydric alcohols. The acid number (in water) of these compounds (a) is in most cases between 10 and 1,000, preferably between 100 and 800;

(b) organic bases, such as aliphatic secondary and/or tertiary amines, for example diisopropanolamine and also trimethylamine, triethylamine and tripropylamine. Bases with mixed substitution, for example, N,N-dimethylcyclohexylamine, N-methylmorpholine and bases containing hydroxyl groups, for example N,N-dimethylaminoethanol and N,N-diethylaminoethanol, can also be used. The quantity of base used is in general 50 to 120%, preferably 55 to 100%, of the quantity required for neutralizing the free carboxyl groups present in component A;

(c1) polyesters with free OH groups. They can be prepared from polycarboxylic acids such as phthalic, isophthalic, terephthalic, trimellitic, pyromellitic, maleic, fumaric, endomethylenetetrahydrophthalic, hexahydrophthalic, succinic, adipic, suberic, azelaic and sebacic acid, alkyl-substituted derivatives of these acids and their possible anhydrides. Suitable alcohol components of the polyesters are the aliphatic and/or cycloaliphatic polyols known in this field and having 2 to 4 OH groups per molecule, such as ethylene glycol, the propanediols, butanediols, pentanediols, neopentyl glycol, hexanediols, diethylene glycol, glycerol, trimethylolethane, trimethylolpropane, pentaerythritol and dipentaerythritol. The said acids and alcohols can have been partially replaced in a manner known per se by monocarboxylic acids or monohydric alcohols. The components and the polyesters can each be employed individually or as a mixture. Polymerization products which are prepared, for example, by copolymerizing olefinically unsaturated monomeric compounds, of which at least one must also contain hydroxyl groups, are also suitable. Examples of such compounds are polymerizable esters of organic acids having 2–20 carbon atoms, such as vinyl esters, for example vinyl acetate, vinyl propionate, vinyl butyrate, vinyl isobutyrate, vinyl benzoate, esters of acrylic and methacrylic acid with monohydric alcohols having 1 to 10 carbon atoms, such as methyl acrylate, ethyl acrylate, the various propyl, butyl, hexyl and 2-ethylhexyl acrylates and methacrylates, the dialkyl esters of maleic and fumaric acids, such as dimethyl, diethyl and diallyl maleate and fumarate. Examples of copolymerizable ethylenically unsaturated monomers containing hydroxyl groups are hydroxyalkyl acrylates and methacrylates, such as 2-hydroxyethyl, 2-hydroxypropyl, 3-hydroxypropyl and 4-hydroxybutyl acrylate or methacrylate. Mixtures of the said esters can also be employed. Ethylenically unsaturated monoolefinic hydrocarbons such as styrene, α-methylstyrene and vinyltoluene are also suitable.

The compounds (c1) preferably have OH numbers in the range from 50 to 130. The solids ratio of polycarboxylic acid anhydride mixture (a) to (c1) is in general between 50:50 and 10:90, preferably 40:60 to 15:85;

(c2) epoxidized oils, for example those based on soya oil, linseed oil, tall oil and/or castor oil, having epoxy numbers from 1 to 50, preferably from 2 to 25 and in particular 3 to 15. The epoxide groups of component (c2) react by forming esters with the COOH groups of the reaction mixtures obtained from (a) and (c1). The ratio of the free carboxyl group equivalent of this reaction mixture to the epoxide group equivalent of (c2) is in general 3:1 to 1:3, preferably 1.25:1 to 1:1.25.

As the component (B), α,β-olefinically unsaturated monomers, and in fact virtually all monomers which are polymerizable by a free-radical mechanism, can be used, but the usual restrictions apply to copolymerizations, as given by the Q and e scheme according to Alfrey and Price or by the copolymerization parameters (cf., for example, Brandrup, Immergut, Polymer Handbook, 2nd edition (1975), John Wiley & Son, New York).

The use of hydrophilic monomers for the component (B) for carrying out the polymerizations according to the invention is possible, but not generally necessary.

The following may be mentioned here as examples of suitable α,β-olefinically unsaturated monomers (B):

(B1) Acrylate and methacrylate (=(meth)acrylate) monomers of the general formula

  (1), in which $R^1$ and X represent:

$R^1 = H$, methyl;

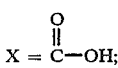

$= C-OR^2$ with $R^2 = (C_1-C_{25})$-alkyl radical which may contain fluorine, preferably $(C_1-C_6)$-alkyl; $R^2$ is especially the radical: $(CH_2)_n-(CF_2)_m-R^3$ with $R^3 = H$, $n = 0$ to 10, preferably 0 to 6 and $m = 0$ to 25, preferably 0 to 10;

$= \overset{O}{\underset{\|}{C}}-O(R^4O)_rR^5$ with $R^4 = (C_1-C_6)$-alkyl which may contain hydroxyl groups, $R^5 = H$ or $(C_1-C_4)$-alkyl, preferably methyl or ethyl, and $r = 1$ to 10, preferably 1 to 6;

$= \overset{O}{\underset{\|}{C}}-NR^6R^7$, in which $R^6$ is H, alkyl having preferably 1 to 6 carbon atoms or $(R^8O)_sR^9$, ($R^8$ = a $(C_1-C_6)$-alkylene group which may contain hydroxyl groups, $s = 1$ to 10, preferably 1 or 2, $R^9 = H$ or alkyl having preferably 1 to 6 carbon atoms) and $R^7$ independently of $R^6$ is H or alkyl having preferably 1 to 6 carbon atoms;
= CN;
= an acyl radical containing glycidyl groups and having preferably 1 to 6 carbon atoms, in particular the

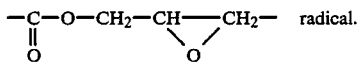 radical.

(Representatives of, (B1) are, for example, (meth)acrylic acid, methyl (meth)acrylate, ethyl (meth)acrylate, propyl (meth)acrylate, the various butyl (meth)acrylates, 2-ethylhexyl (meth)acrylate, esters of (meth)acrylic acid with polyhydric alcohols such as ethylene glycol, propylene 1,2-glycol or propylene 1,3-glycol, butylene 1,4-glycol, trimethylolpropane and glycerol, such as hydroxyethyl or hydroxypropyl (meth)acrylate; reaction products of (meth)acrylic acid with terminal epoxides, such as hexene oxide or dodecene oxide, or with glycidyl esters such as ®Cardura E (glycidyl ester of "versatic acid"); aminoalkyl compounds, such as methylaminoethyl (meth)acrylate and tert.-butylaminoethyl (meth)acrylate; N-alkylol-(meth)acrylamides such as N-methylol-(meth)acrylamide and corresponding ethers, such as N-methylol(meth)acrylamide methyl, ethyl or butyl ether; (meth)acrylonitrile; and glycidyl (meth)acrylate;

(B2) Dicarboxylic acids, such as maleic acid, fumaric acid, itaconic acid, sorbic acid or their monoesters and diesters with $OR^2$ or $(R^4O)_rR^5$ as the ester radical, $R^2$, $R^4$, $R^5$ and r being as defined above; and also further derivatives such as described above under (B1) (amides, N-alkylolamides, nitriles and the like);

B3) vinyl esters of aliphatic carboxylic acids having 2 to 20 carbon atoms, preferably 2 to 12 carbon atoms, such as vinyl acetate, vinyl propionate, vinyl esters of branched ($C_9$–$C_{12}$)-carboxylic acids, such as the vinyl ester of versatic acid or vinyl linoleate;

(B4) vinyl compounds (other than B3), such as vinyl ethers, for example methyl vinyl ether, ethyl vinyl ether or alkyl vinyl ethers having 3 to 6 carbon atoms; allyl ethers such as allyl glycidyl ether; and N-vinylpyrrolidone;

(B5) vinylaromatic monomers such as styrene, α-methylstyrene, vinyltoluene and vinylpyridine;

(B6) monomers containing halogen, in particular containing chlorine or fluorine, such as vinyl chloride, vinylidene chloride, hexafluoropropene, perfluorohexylethylene, 2-hydroperfluoroethyl allyl ether and 2-hydroperfluoropropyl allyl ether;

(B7) monomers with isocyanate groups, such as isocyanatoethyl (meth)acrylate and corresponding derivatives with blocked isocyanate groups; and also vinylurethanes, obtained by reacting vinyl isocyanate with usual blocking agents; examples of this last group are: tert.-butyl N-vinylcarbamate, cyclohexyl N-vinylcarbamate and the N-vinylcarbamic acid/ε-caprolactam adduct.

(B8) monomers of the type of ethylenically polyunsaturated, preferably diunsaturated to triunsaturated, compounds such as divinylbenzene, ethanediol di(meth)acrylate, propanediol di(meth)acrylate, butanediol di(meth)acrylate, hexanediol di(meth)acrylate, glycerol tri(meth)acrylate, pentaerythritol tri(meth)acrylate and diallyl phthalate. These ethylenically polyunsaturated monomers are used only together with at least one monomer (B1) to (B7); their quantity is in general 0.01 to 20% by weight, relative to the total quantity of monomers (B). By means of adding these monomers which act as crosslinking agents, dispersions with partially or fully crosslinked particles can be prepared.

Within the above groups (B1) to (B8), mixtures of the individual representatives can also be used. According to the invention, it is preferred to use the α,β-olefinically unsaturated compounds of group (B1).

In order to enable crosslinking reactions to proceed in the paint during film formation, it is advantageous when monomer units with functional groups are present in the binder according to the invention, both in the case of self-crosslinking and in the case of crosslinking by co-reaction. Monomers with functional groups are to be understood as those which, in addition to their olefinic double bond, by means of which they are copolymerized in the copolymer being formed during the preparation of the binder, additionally also carry chemical groupings which can be reacted at a later stage, preferably after application of the finished paint, under the action of thermal or radiant energy and/or catalysts with chemical groupings of the same type or a different type, in such a way that cross-linking takes place. Examples of chemical groupings which can be employed and which can lead to crosslinkings in the applied paint are carboxylic acid, sulfonic acid, hydroxyl, amino, amido, keto, aldehyde, lactam, lactone, isocyanate and epoxy groups. Copolymerizable monomers which carry such functional groupings are known. Some of these groupings having a crosslinking action are already present in component (A) (carboxyl, hydroxyl and epoxide groups). In order to obtain the highest possible crosslinking density, comonomers containing correspondingly reactive groups are also used advantageously within the scope of component (B).

Examples of these are hydroxyalkyl (meth)acrylates, N-alkylol (meth)acrylates, glycidyl (meth)acrylates and isocyanatoalkyl (meth)acrylates. The quantity of these comonomers within component (B) is in general 0 to 60% by weight, preferably 0.5 to 40% by weight.

The quantity ratios of components (A) and (B) can vary within wide limits. Preferably, 5 to 95% by weight, in particular 10 to 69% by weight and especially 25 to 45% by weight of component (A) are reacted with 95 to 5% by weight, in particular 90 to 31% by weight and especially 75 to 55% by weight of the monomers (B), the quantity ratios relating to the total solids content of components (A) and (B). The self curing component (A) is here employed in general in the form of a 5 to 65% by weight aqueous system.

Preferred dispersion copolymers can contain as the monomer units, relative to the quantity of component (B), up to 100% by weight of methyl methacrylate and/or N-butyl acrylate, 0 to 20% by weight of hydroxyethyl methacrylate, 0 to 20% by weight of glycidyl methacrylate and 0 to 20% by weight of acrylic acid and/or methacrylic acid, the sum of the monomer units always being 100%. A mixing ratio is particularly preferred which gives 15 to 80% by weight of methyl methacrylate, 15 to 50% by weight of n-butyl acrylate, 0 to 15% by weight of hydroxyethyl methacrylate, 0 to 15% by weight of glycidyl methacrylate and 0 to 5% by weight of acrylic acid and/or methacrylic acid as the monomer units.

The polymerization process according to the invention is preferably carried out as an emulsion polymerization in an aqueous medium at temperatures in the range between 0 and 150, preferably 20 and 100, in particular 40° and 90° C. The carboxyl-functional polymer (A) is here polymerized with the vinyl monomers (B) preferably with the addition of a polymerization initiator and, if appropriate, further conventional additives such as emulsifiers and/or protective colloids as well as molecular weight regulators. The aqueous medium of the polymerization batch can originate from the aqueous systems of component (A), but in general further water is added to the batch in order to obtain the best conditions for the emulsion polymerization.

The polymerization can be carried out in such a way that the carboxy-functional polymer (A) is first introduced as an aqueous system, to which the total quantity of the water present in the polymerization has been added, together with a part of an initiator and, if appropriate, an emulsifier and a molecular weight regulator and is preheated to the desired polymerization temperature, whereupon the monomer mixture (B) and the remainder of the initiator are added slowly. It is also possible, however, first to introduce in each case a part of the water, of the carboxy-functional polymer (A) and, if appropriate, the emulsifier and to prepare a pre-emulsion from the remaining water, the remaining quantities of component (A), the vinyl monomers (B) and, if appropriate, an emulsifier, which pre-emulsion is then added slowly to the first charge which has been preheated to the polymerization temperature and to which a polymerization initiator has been added. The addition time is preferably 30 to 180 minutes. When the addition of the monomer mixture has ended, the entire batch is stirred for a further 1 to 3 hours at 60° to 90° C., preferably at 70° to 85° C., further initiator being added if necessary, in order to obtain complete conversion of the vinyl monomers. The solids content in the polymer dispersions obtained is in general 5 to 75, preferably 10 to 65 percent by weight. The value of the average molecular weight $\overline{M}_w$ of the polymer obtained is in general 50,000 to 10 million, preferably 75,000 to 1 million, relative to a polystyrene standard gel chromatogram.

The initiator can be water-soluble and/or monomer-soluble. Examples of initiators forming free radicals are percarbonates, peresters such as tert.-butyl perpivalate and peroctoate, benzoyl peroxide, o-methoxybenzoyl peroxide, dichlorobenzyl peroxide, azodiisobutyrodinitrile, and in particular peroxy compounds or aliphatic azo compounds. Preferred examples are sodium, potassium and ammonium peroxydisulfate or sodium, potassium and ammonium peroxydisulfate redox systems with sodium, potassium and ammonium sulfides, sulfites or other reducing agents. The quantity of polymerization initiator is in general 0.01 to 10, preferably 0.02 to 5 and especially 0.05 to 3% by weight, relative to the total quantity of the vinyl monomers (B).

The polymerization can be carried out in the presence or absence of an emulsifier and/or a protective colloid. If appropriate, anionic and/or non-ionic emulsifiers are here employed. Examples of anionic emulsifiers are the alkali metal salts and ammonium salts of sulfuric acid half-esters of alkylphenols or the abovementioned alcohols or alkylsulfonate or arylsulfonate, preferably the alkali metal salts of the sulfuric acid half-ester of a nonylphenol reacted with 4 to 5 mol of ethylene oxide, sodium laurylsulfate, ethoxylated sodium laurylsulfate and secondary sodium alkanesulfonates, the carbon chain of which contains 8 to 12 carbon atoms.

To increase the stability of the aqueous copolymer dispersion, a non-ionic emulsifier of the type of an ethoxylated alkylphenol or fatty alcohol, for example nonylphenol with 4 to 30 mol of ethylene oxide, can also be employed as a mixture with the anionic emulsifier.

The quantity of the anionic emulsifier is 0 to 15% by weight, relative to the vinyl monomers (B).

Moreover, a "fluorosurfactant" can be used as the emulsifier, the term "fluorosurfactant" being understood to mean surface active compounds which, as the hydrophobic constituents, contain perfluoroalkyl radicals having 2 to 20 carbon atoms or perfluoroaralkyl radicals in the molecule, for example perfluoroalkylsulfonic acids, perfluoroaralkylsulfonic acids, long-chain perfluoroalkylcarboxylic acids, perfluoroalkane-phosphonic and -phosphinic acids, in each case having 1 to 15 carbon atoms in the alkane radical, the salts of these acids, perfluoroalkyl sulfates and perfluoroaralkyl sulfate.

The molecular weight of the polymers can be reduced in a known manner by the use of molecular weight regulators such as mercaptans, halogen-containing compounds and other substances transferring free radicals. Butyl mercaptan, octyl mercaptan, dodecyl mercaptan, tetrakis-mercaptoacetylpentaerythritol, chloroform, bromoform, trichloroethylene, trichlorobromomethane, carbon tetrachloride and toluene are preferred.

The polymer dispersions according to the invention are self-crosslinking. Apart from this, crosslinking by co-reaction is in addition also possible. For this purpose, the binder dispersion according to the invention, which carries one or more of the said functional monomer units, is mixed during formulation of the coating with a further low-molecular, oligomeric and/or polymeric compound which likewise carries functional groupings.

Crosslinking of the binder takes place also in co-reaction, preferably during baking, and with particular preference by reaction between the polymer dispersion according to the invention and the added co-reactant. It is then not always impossible for both components also to be able to undergo reactions and/or crosslinking with themselves.

Examples of crosslinking co-reactants are aminoplast resins, in particular melamine/formaldehyde resins, phenoplast resins, acrylate resins, isocyanates or masked isocyanate resins i.e. isocyanate resins with a blocked isocyanate group; with or without the action of catalysts such as maleic acid, citric acid, phosphoric acid, an alkylphosphoric acid, p-toluenesulfonic acid and/or a naphthalenedisulfonic acid, these co-reactants can give highly crosslinked coatings on baking in the presence of binder copolymers which preferably carry hydroxyl, amide or carboxyl groups. Acrylic resins and/or methyl-etherified melamine resins are employed particularly preferably as the co-reactants for crosslinking.

Due to their chemical structure, the polymer dispersions according to the invention are suitable for manifold applications, for example for the preparation of coating systems which cure at room temperature or at elevated temperature. They are not only crosslinkable by co-reaction, but can also be combined, and are in general compatible, with other aqueous plastics dispersions, for example thermoplastics based on polyvinyl acetate, polyvinyl chloride, acrylic and/or methacrylic polymers, polyvinyl ether, polychloroprene, polyacrylonitrile and ethylene/butadiene/styrene copolymers. They are especially compatible with dispersions of those copolymers which have been rendered more highly polar by copolymerization of the abovementioned monomers with functional monomers such as hydroxyalkyl acrylates or methacrylates. If necessary, the dispersions are employed together with dispersing assistants.

The polymer dispersions according to the invention can also be combined with substances which have a thickening action and are based on polyacrylates, hydroxyethylcelluloses, polyvinyl alcohols and others, so that the rheological properties can be adjusted in any desired way. So-called reactive diluents can also be employed.

Using the polymer dispersions according to the invention, which show excellent stability under UV radiation, coating systems, such as, for example, finishes, which are unpigmented or pigmented or have been provided with other additives and which cure sufficiently rapidly even at room temperature, if necessary also under the action of catalysts, and then give coatings having outstanding mechanical properties, can be prepared. In this case, films of high mechanical strength and high chemical resistance are obtained. Conventional coating additives are described, for example, in German Offenlegungsschrift No. 3,301,729.

The polymer dispersions according to the invention can be applied to the most diverse substrates, provided that these withstand the curing temperatures of the coating. Examples of suitable substrates are ceramics, wood, glass, concrete, plastics, and preferably metal, such as iron, tin, titanium, copper, aluminum, steel, brass, bronze, magnesium or the like, and the substrates can, if necessary, also be treated for promoting adhesion or improving corrosion resistance by suitable mechanical and/or chemical pretreatment. However, they show excellent adhesion to the most diverse metal substrates without an adhesion-promoting primer or intercoat. The good adhesion of these coatings corresponds to the ratings GT 0A to GT 1A according to the test instructions in DIN 53 151. Moreover, these coatings, which can be adjusted to be glossy or matt as desired, can very readily be deformed, have high weathering resistance and excellent chemical resistance.

The dispersions according to the invention are suitable for the preparation of anti-corrosive coatings and/or intercoats for the most diverse fields of application, in particular as resistant finishes and matt finishes and as metallic-effect finishes. The layer thicknesses of the individual paint coats are in general 10–40 μm, preferably 15–25 μm, in the basecoat, whereas the topcoat in general has thicknesses of 20–70 μm, preferably 30–50 μm.

For example, in the preparation of metal-free (uni) coats or metallic effect coats, the binder mixture is applied to a prepared surface, for example sprayed onto a motor vehicle body provided with filler, dried in air and then coated with a topcoat. Both layers are then baked in one working step, for example for 10–40 minutes at 100°–180° C., the temperature being related to the baking time.

The dispersions according to the invention are also suitable for the coating and lining of articles which come into contact with fuels and solvents, and also for coatings which are to protect against atmospheric effects, such as roadmarkings, components for electrical engineering purposes or elements thereof, in particular for electric conductors, and for coatings on thermally stressed articles.

Because of their advantageous properties, the dispersions according to the invention are also excellently suitable for one-coat finishes. Depending on the selection of the components, metal sheets coated with the binders according to the invention can afterwards be deformed by deep-drawing, edging, profiling, embossing or the like without significantly impairing the other favorable properties. The adhering coating layer can remain unchanged, but it can also be used as an interlayer, i.e. as a substrate for further coatings which in turn can comprise the same or another conventional coating material.

Because of their good dilutability and their other favorable properties, the dispersions according to the invention are also suitable for use in electrocoating.

A further possibility is their use in water-dilutable adhesives. They can also be employed as binders for textile, organic and/or inorganic materials. They are also suitable for use in curable molding compositions, casting resins, putties, cellular or porous materials, such as foams, and as insulating lacquer.

In the instructions and examples which follow, T always means parts by weight and % means percent by weight, unless otherwise stated. Water always means deionized water, SN means acid number and OHN means OH number. Unless otherwise stated, anhydride mixtures prepared by reacting trimellitic anhydride with 1,2-propanediol and thus composed of trimellitic anhydride and anhydrides of the formulae (1) and (2) (see formula sheet) were always employed as the polycarboxylic acid component (a), and polyesters prepared as described in German Offenlegungsschrift No. 2,811,913 were always employed as the component (c1) containing OH groups.

EXAMPLES (1a) Preparation of a carboxy-functional polymer containing epoxide groups (component A)

1536 g of trimellitic anhydride (TMA) were melted in a 4 liter reaction vessel, with addition of 80 g of xylene. 2.5 g of sodium tungstophosphate were added and the batch was heated to 190° C. 308 g of 1,2-propanediol were then introduced into the melt and the batch was heated within 1 to 1.5 hours to 200° C. The reaction temperature was raised to 220° C. and held until the elimination of water was complete. After about 4 hours, the quantity of water was about 150 to 160 ml.

The reaction mixture was then cooled to about 180° C. and the xylene was distilled off by means of a water-pump vacuum. After cooling, about 1680 g of a solid, yellowish resin were obtained.

The following characteristic data were found:
Acid number (in acetone/H$_2$O) : 550–580 mg of KOH/g
Acid number (in butanol) : 270–290 mg of KOH/g
Analysis by gel permeation chromatography (GPC) gave the following composition:

TMA: 5–20 %

Bisanhydride: 40–60 %

Oligomers: 20–55%.

100 parts of the above-described anhydride mixture, which had been homogenized in 30 parts of acetone at 50° C., were added dropwise within one hour to a solution of 127 parts of a polyester based on terephthalic acid, isophthalic acid, trimellitic acid, ethylene glycol, neopentyl glycol and hexanediol (OHN=107) in 70 parts of methyl ethyl ketone. The reaction mixture was stirred at 90° C. until it had reached an acid number of 197 (relative to 100% resin) in water. A further 15 parts of water were then admixed. After stirring at 80°-90° C. for 6 hours, the acid number in butanol was 180 (100% resin). The temperature of the mixture was lowered to 60° C. and 133 parts of an epoxidized linseed oil (epoxy number=8.9) were added dropwise in the course of 2 hours. The mixture was stirred until the acid number in butanol had fallen to 90. A mixture of 56 parts of dimethylaminoethanol in 540 parts of water was then stirred in. This gave a light yellow, opalescent solution from which the organic solvent was distilled off under 0.1 bar at 40° C. After filtration, a yellowish, virtually clear aqueous resin solution was obtained. Solids content (1 hour at 125° C.) about 39%; pH value about 6.

(1b) Preparation of the polymer dispersion 355 parts of the (39%) aqueous dispersion from (1a) were mixed with 452 parts of water in a reactor which was equipped with stirrer, reflux condenser, internal thermometer and metering devices for the monomers and the initiator, the mixture was heated to 80° C. with stirring and a solution of 0.5 part of ammonium peroxydisulfate in 35 parts of water was added. 5 minutes after the addition of the initiator, 35 parts of a monomer mixture composed of 165 parts of methyl methacrylate, 142 parts of n-butyl acrylate and 24 parts of hydroxyethyl acrylate were added and, after a further 15 minutes of pre-polymerization, the remaining monomer quantity was metered in over 2 hours. 10 minutes after the end of the addition, a further 0.2 part of ammonium peroxydisulfate dissolved in 10 parts of water was added within 10 minutes and the batch was stirred for a further 2 hours at 80° C., in order to obtain complete conversion. This gave a stable aqueous dispersion of about 40% solids content.

(2) Preparation of a polymer dispersion Example 1b was repeated, but with the difference that glycidyl methacrylate was now employed instead of hydroxyethyl acrylate. This likewise gave a stable dispersion of about 40 % solids content.

(3a) Preparation of a carboxy-functional polymer containing epoxide groups (component A)

100 parts of anhydride mixture (SN/H₂O=486) in 108 parts of xylene and 141 parts of a polyester (OHN=88) in 70 parts of methyl ethyl ketone were reacted as in Example 1a, until the reaction mixture had reached an acid number of 165 (100% resin) in water. 12 parts of water were then admixed, an acid number of 168 (100% resin) in butanol being reached after stirring for 6 hours at 80°-90° C. The temperature of the mixture was lowered to 60° C. and, after the addition of 0.3 part of lithium benzoate, 132 parts of an epoxidized linseed oil (epoxide number=8.7) were added dropwise in the course of 2 hours and the mixture was stirred until the acid number in butanol had fallen to 86.5. A mixture of 42 parts of dimethylamine (60% in water) in 860 parts of water was then stirred in. This gave a light yellow, opalescent solution, from which the organic solvent was distilled off under 0.1 bar at 40° C. After filtration, a yellowish, virtually clear aqueous resin solution was obtained. Solids content (1 hour at 125° C.) about 32%; pH value about 6.

(3b) Preparation of the polymer dispersion

A reactor as in Example (1b) was filled with 705 parts of the aqueous (32%) dispersions from 3a and 196 parts of water. This mixture was heated to 80° C. with stirring, and a solution of 0.5 part of ammonium peroxydisulfate in 35 parts of water was added. 5 minutes after the addition of the initiator, 35 parts of a monomer mixture composed of 125 parts of methyl methacrylate, 94 parts of n-butyl acrylate and 17 parts of hydroxymethyl methacrylate were added and the mixture was further processed as described in Example 1b. This gave a stable dispersion of about 40% solids content.

(4) Preparation of a polymer dispersion

Example 3b was repeated, but with the difference that glycidyl methacrylate was employed in place of hydroxyethyl methacrylate.

This gives a stable dispersion of about 40% solids content.

Comparison examples (V1) The resin solution of Example (1a) was employed for the binder test below.

(V2) The resin solution of Example (3a) was employed for the binder test below.

(V3) In a reaction vessel as in Example (1b), 14 parts of a monomer emulsion composed of 652 parts of water, 21 parts of a 50% aqueous solution of a sodium alkylarylpolyglycol-ether-sulfate salt (®Hostapal BV from Hoechst (AG) and 1.75 parts of ammonium peroxydisulfate were dissolved in 536 parts of water and heated to 80° C. To this mixture, a further 80 parts of a 50% aqueous solution of the said sodium alkylaryl-polyglycol-ether-sulfate salt, 22 parts of N-methylolacrylamide, 44 parts of methacrylic acid, 55 parts of glycidyl methacrylate, 110 parts of hydroxyethyl methacrylate, 550 parts of methyl methacrylate, 550 parts of n-butyl acrylate and 3 parts of ammonium peroxydisulfate were added. After about 10 minutes, the remainder of the monomer emulsion was metered in over 3 hours. Subsequently, the temperature was raised to 85° C. and stirring was continued for a further 2 hours, SN 22. After cooling to 20° C., the batch was adjusted with about 80 parts of a 25% aqueous dimethylaminoethanol solution to a pH value of 8.0-8.2. This gave an aqueous dispersion having a solids content of about 50%.

(V4) 100 parts of the dispersion from Comparison Example V3 (50% solids) were mixed with 156.3 parts of the dispersion from Example (3a) (32% solids) with stirring, an aqueous binder dispersion of about 39% solids content being obtained.

(5) The binder dispersions described above from Examples 1 to 4 and those from Comparison Examples V1-V4 were tested in the following manner:

A. Formulation for unpigmented basecoats

The binder solutions or dispersions from the said examples were diluted with water to a solids content of 25% and tested in this form.

B. Formulation for pigmented metallic-effect basecoats 5 parts of a commercially available aluminum paste (Stapa Hydrolac WH 33 n.1. from Eckart, Fürth/Bavaria), having a solids content of 65% and an average particle size of the aluminum flakes of 11 μm, were dispersed with 5 parts of ethylene glycol monobutyl ether and 0.01 part of a commercially available wetting agent (® Genapol PF 20 from Hoechst AG) for 20 minutes by means of a high-speed stirrer at a peripheral velocity of 5 m/s. 10 parts of the aluminum dispersion obtained were mixed with in each case 100 parts of the binder dispersions obtained according to (5A), giving a solids content of 25.6% in each case with a flow time of 13 seconds according to DIN 53 211 (23° C.).

C. Tests

The pigmented and unpigmented coatings according to (5A) and (5B) were tested as follows:

Body panels were primed according to the cataphoresis electrocoating process and baked within 20 minutes at 180° C. The primed panels were then coated with a baking filler based on a commercially available polyester resin (®Alftalat VAN 1951 from Hoechst AG) and a likewise commercially available butyletherified melamine resin (®Maprenal MF 590 from Hoechst AG) and cured again within 20 minutes at 160° C. The pigmented and unpigmented base coats according to (5A) and (5B) were then applied in a dry film thickness of 10 to 15 μm to the panels thus pretreated.

After drying (5 minutes) at room temperature (23° C., 55% relative humidity), the paint surfaces were coated in a dry film thickness of about 35 μm with a 2-component clear coat which was a mixture of a commercially available acrylate resin containing OH groups (®Macrynal SM 510n from Hoechst AG) and a likewise commercially available aliphatic polyisocyanate (®Desmodur N/75% from Bayer AG). The coated panels with the 4-layer paint structure were baked for 20 minutes at 135° C.

After storage for 16 hours at room temperature, the coated panels were subjected to storage under water at 40° C. for 120 hours, and the coatings were then examined for blistering, discoloration, surface blemishes, loss of gloss and loss of adhesion. The test results are listed in Table 1.

TABLE 1

Test results on the binder dispersions in unpigmented basecoats and in metallic basecoat formulations under "original coating conditions"

| Dispersion of Example | Clear coat Formulation 5A | | Metallic basecoat Formulation 5B | | Rheolgy adjustable with thickener (aqueous paints according to 5A and 5B) |
|---|---|---|---|---|---|
| | Storage in water | Intercoat adhesion | Storage in water | Intercoat adhesion | |
| 1b | + | + | + | + | yes |
| 2 | + | + | + | + | yes |
| 3b | + | + | + | + | yes |
| 4 | + | + | + | + | yes |
| V1 | + | + | − | + | no |
| V2 | + | + | + | + | no |
| V3 | + | − | + | − | yes |
| V4 | − | − | − | − | no |

Regarding the ratings, see legend under TABLE 2

In order to ensure satisfactory applicability of the paints, the rheology of the paints must be adjustable. This is not possible in cases V1, V2 and V4 with thickeners corresponding to the state of the art.

A further set of panels was, without sanding the clear coat, coated a second time with the particular corresponding pigmented and unpigmented basecoat in the manner described above, and a baking clear coat, built up from a commercial available acrylic resin crosslinking by co-reaction (®Synthacryl SC 303 from Hoechst AG) and a butyl-etherified melamine resin (®Maprenal MF 650, from Hoechst AG) and additionally containing 3% of a catalyst in the form of p-toluenesulfonic acid, calculated on solid butylated melamine resin, was then applied. These test panels each provided with 6 layers of paint were baked for 45 minutes at 80° C. This test simulated the use of the polymers according to the invention as refinishing paints in an automobile factory. These test panels were subjected to the abovementioned testing scheme. In the evaluation of the test, particular attention was paid to the intercoat adhesion between the 2-component polyurethene clear coat and the next base layer. The test results are listed in Table 2.

TABLE 2

Test results on the binder dispersions in unpigmented basecoats and in metallic-effect basecoats under "refinishing conditions"

| Dispersion from Example | Clear coat Formulation 5A | | Metallic-effect basecoat Formulation 5B | |
|---|---|---|---|---|
| | Storage in water | Intercoat adhesion | Storage in water | Intercoat adhesion |
| 1b | + | + | + | + |
| 2 | + | + | + | + |
| 3b | + | + | + | + |
| 4 | + | + | + | + |
| V1 | − | + | − | + |
| V2 | − | + | − | + |
| V3 | + | − | + | − |
| V4 | − | − | − | − |

+: Test passed (no softening, no blistering etc. and/or no loss of adhesion)
−: Test failed (softening, blistering etc. and/or loss of adhesion).

(6)A The above-described binder dispersions from Example 4 and Comparison Example (V3) were diluted with water to a solids content of 25% and tested in this form.

(6)B Formulation for pigmented, metal-free basecoats (so-called uni basecoats)

304 parts of the binder dispersions described under (6) A from Examples (4) and (V3) are mixed with 220 parts of a pigment paste, composed of 600 parts of commercially available titanium dioxide pigment (Kronos®) CL 310 from Titangesellschaft, Frankfurt), 50 parts of butylglycol and 300 parts of a 2.4 % aqueous solution of a commercially available polyacrylate thickener (Viscalex® HV 30 from Allied Colloids, England) and diluted with water to a solids content of 17%. The straight basecoats are then adjusted with triethylamine to a pH value of 7.2.

(6)C Tests

The pigmented straight basecoats according to (6) B are applied according to (5) C and tested. The test results are summarized in Table 3.

TABLE 3

Test results on the binder dispersions in pigmented uni basecoats under "original coating conditions", formulation 6) B.

| Dispersion from Example | Storage in water | Intercoat adhesion |
|---|---|---|
| 4) | + | + |
| V3) | + | − |

+ = Test passed (no softening, no blistering, etc. and/or no loss of adhesion)
− = Test failed (softening, blistering etc. and/or loss of adhesion)

We claim:

1. An stable aqueous polymer dispersion comprising water and solids of the group consisting essentially of (A) 1 to 99% by weight of a carboxyfunctional polymer which additionally has an epoxy number of 0.2 to 4.0, (B) 1 to 99% by weight of a polymer obtained from at least one α,β olefinically unsaturated monomer, the polymer (B) having been prepared in the presence of polymer (A), (C) 0 to 20% by weight of anionic or non-ionic emulsifiers or a mixture of the two or protective colloids, and possible further conventional additives, the sum of all the solid components always being 100%.

2. An aqueous polymer dispersion as claimed in claim 1, wherein the acid number of component (A) is 1 to 200.

3. An aqueous polymer dispersion as claimed in claim 1, wherein the molecular weight (weight average $M_w$) of component (A) is between 2,000 and 100,000.

4. An aqueous polymer dispersion as claimed in claim 1, wherein the component (A) is obtained by reacting (a) halogen-free polycarboxylic acid units, (b) salt-forming substances from the group comprising alkali, alkaline earth and quaternary ammonium salts, organic bases and/or ammonia, (c1) polymers containing OH groups and having an OH number from 20 to 150 and/or (c2) epoxide compounds.

5. An aqueous polymer dispersion as claimed in claim 1, wherein the components (A) and (B) are each employed in quantities from 5 to 95% by weight.

6. An aqueous polymer dispersion as claimed in claim 1, wherein 0.01 to 20% by weight, relative to the total quantity of monomers (B), of α,β-ethylenically diunsaturated or triunsaturated monomers are employed.

7. An aqueous polymer dispersion as claimed in claim 1, wherein up to 100% by weight of at least one compound from the group comprising methyl methacrylate and n-butyl acrylate, 0 to 20% by weight of hydroxyethyl methacrylate, 0 to 20% by weight of glycidyl methacrylate and 0 to 20% by weight of acrylic and/or methacrylic acid are present as the component (B), the sum always being 100% of the monomers.

8. An aqueous polymer dispersion as claimed in claim 7, wherein 15 to 80% by weight of methyl methacrylate, 15 to 50% by weight of n-butyl acrylate, 0 to 15% by weight of hydroxyethyl methacrylate, 0 to 15% by weight of glycidyl methacrylate and 0 to 5% by weight of acrylic and/or methacrylic acid are employed as the component (B).

9. An aqueous polymer dispersion as claimed in claim 1, wherein the solids content of the polymer dispersion is 5 to 75% by weight.

10. A process for the preparation of the stable aqueous polymer dispersion of claim 1 comprising polymerizing, in an aqueous system at a temperature between 0° and 150° C., (B) 1 to 99% by weight of at least one α,β-olefinically unsaturated monomer in the presence of (A) 1 to 99% by weight of a carboxy-functional polymer which additionally has an epoxy number of 0.2 to 4.0 and of (C) 0 to 20% by weight of anionic or non-ionic emulsifiers or a mixture of the two or protective colloids, the quantity data relating to the solids content of components (A) to (C).

11. The process as claimed in claim 10, wherein the polymerization is carried out at a temperature from 20° to 100° C.

12. The process as claimed in claim 10, wherein no emulsifiers and/or protective colloids are employed.

13. The process as claimed in claim 10, wherein the polymerization is carried out in the presence of 0.02 to 5% by weight of an initiator which forms free radicals.

14. The process of claim 10 wherein the polymerization is effected in the presence of further conventional additives.

15. A coating system curable at room temperature or elevated temperature containing as a binder component the aqueous dispersion of claim 1.

16. The coating systems of claim 14 which are metallic basecoats, metal-free (uni)basecoats, refinishing paints or electrocoatings.

* * * * *